(12) United States Patent
Chuprun et al.

(10) Patent No.: US 6,385,434 B1
(45) Date of Patent: May 7, 2002

(54) WIRELESS ACCESS UNIT UTILIZING ADAPTIVE SPECTRUM EXPLOITATION

(75) Inventors: Jeffery Scott Chuprun, Scottsdale; Chad S. Bergstrom; Byron Tarver, both of Chandler; Bennett C. Beaudry, Scottsdale, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/153,976

(22) Filed: Sep. 16, 1998

(51) Int. Cl.$^7$ .................................................. H04B 7/10
(52) U.S. Cl. ....................... 455/11.1; 455/428; 455/430
(58) Field of Search .............................. 455/11.1, 12.1, 455/13.1, 15, 16, 20, 22, 427, 428, 429, 430, 431, 62, 67.1

(56) References Cited

U.S. PATENT DOCUMENTS 5,327,572 A * 7/1994 Freeburg ..................... 455/430
5,832,380 A * 11/1998 Ray et al. .................... 455/430
5,991,345 A * 11/1999 Ramasastry ................. 455/11.1

* cited by examiner

*Primary Examiner*—Thanh Cong Le
(74) *Attorney, Agent, or Firm*—John C. Scott; Frank J. Bogacz

(57) ABSTRACT

A wireless access unit (12) for providing an interface between a satellite communications system (32) and a plurality of terrestrial user devices (14–26) in a centralized or distributed architecture includes a spectrum allocation unit (92) for dynamically allocating spectrum to the plurality of terrestrial user devices (14–26) based on a spectral environment about the wireless access unit (12). A spectrum scan unit (60) scans the spectral environment about the wireless access unit (12) and generates a spectrum signal indicative thereof. An environment understanding unit (61) provides signal information corresponding to signal emitters in proximity to the distributed or centralized network. A spectrum table (90) assembles data related to the spectral environment and the proximity emitters for use by the spectrum allocation unit (92) in dynamically allocating spectrum.

52 Claims, 6 Drawing Sheets

WIRELESS ACCESS UNIT UTILIZING ADAPTIVE SPECTRUM EXPLOITATION

FIELD OF THE INVENTION

The invention relates in general to communications systems and, more particularly, to wireless communications systems for providing high data rate services to a plurality of subscribers within a given service area.

BACKGROUND OF THE INVENTION

Satellite-based communications systems are proposed that will make high data rate/low delay information transfer widely available to the public. However, as presently planned, such satellite systems require an expensive satellite transceiver and directional antenna for each terrestrial user of the system. As can be appreciated, this requirement can make the acquisition of high data rate services prohibitively expensive for many consumers. To reduce consumer costs, and provide high rate data services, a Wireless Information Transfer System (WITS) has been proposed that provides a centralized Wireless Access Unit (WAU) that is capable of providing an interface between a high data rate communications platform and a plurality of terrestrial users (e.g., military, residential, business, retail, medical, university, and/or mobile users). The WAU provides means for communicating with each of the plurality of terrestrial users via high data rate terrestrial wireless links, in one or more native-mode digital channels. Thus, the terrestrial users only require relatively low cost, terrestrial wireless communications equipment as opposed to more expensive satellite transceivers/antennas.

As is apparent from the above description, a WITS-type system can require a significant amount of bandwidth to support high data rate communications among a plurality of terrestrial users. Allocation of useable spectrum is a function that is highly regulated by the government and generally requires an expensive government license to acquire. In addition, the useable spectrum, at least in the lower frequency ranges, is crowded and may not include an adequate amount of available contiguous spectrum to support the required terrestrial links. Another option is to raise the frequency of operation of the terrestrial links of the WITS-type system to portions of the spectrum that are not as densely populated. However, higher frequencies generally require higher priced equipment, thus increasing the costs to consumers. In addition, higher frequency systems generally have a significantly reduced range of transmission, are more sensitive to weather and terrain variables, and are more expensive to maintain.

Therefore, there is a need for a method and apparatus for providing efficient utilization of available spectrum in a centralized or distributed information transfer system, thereby reducing or eliminating the need for a large spectrum allocation or fixed frequencies of operation.

DETAILED DESCRIPTION OF THE DRAWINGS

The present invention relates to a communications system for providing information services to and among a plurality of terrestrial users. The system uses adaptive spectrum exploitation techniques to, for example, provide data throughput via adaptive allocation of unused or underused other-system bandwidth, reduce or avoid undesired interference from/to other systems, provide spectrum environment awareness and understanding information regarding ambient signals from other systems, and provide for cosite contention resolution and automatic spectrum planning. The system is capable of coexisting with already existing military and/or commercial terrestrial communications systems, thereby reducing or eliminating the need for a large dedicated spectrum allocation to support distribution of high rate data services among terrestrial users. A frequency reuse capability is achieved by dynamically scanning and adapting to the unused or under-used spectral environment about the system so that interference with surrounding systems is avoided. The system includes at least one Wireless Access Unit (WAU) that scans the spectral makeup within a frequency band of interest and varies transmit signal parameters based on the detected spectral conditions. By adapting to the spectral environment, the system can coexist with other communications systems which utilize fixed frequency bands that overlap the system's spectral region of operation. In one embodiment, the WAU is capable of performing spectrum adaptation in real-time.

One advantage of the present invention is that it allows a WITS-type WAU to operate within existing military and/or commercial frequency bands or within the frequency bands of other WITS-based networks with reduced or minimal interference from or to these other systems. This greatly increases the number of applications that can be implemented within a given bandwidth. In addition, the invention also allows a WITS-type WAU to maximize the quality of service (e.g., data, speech, imagery, and/or video) provided to terrestrial users of the system. Further, a preferred embodiment of the invention provides an environment understanding functionality that enables the WAU to locate and identify non-network emitters and non-member networks in the vicinity of the WAU and to make transmit signal determinations based thereon. This environment understanding feature can be used for both commercial spectrum adaptation and military tactical applications.

Figure 1:
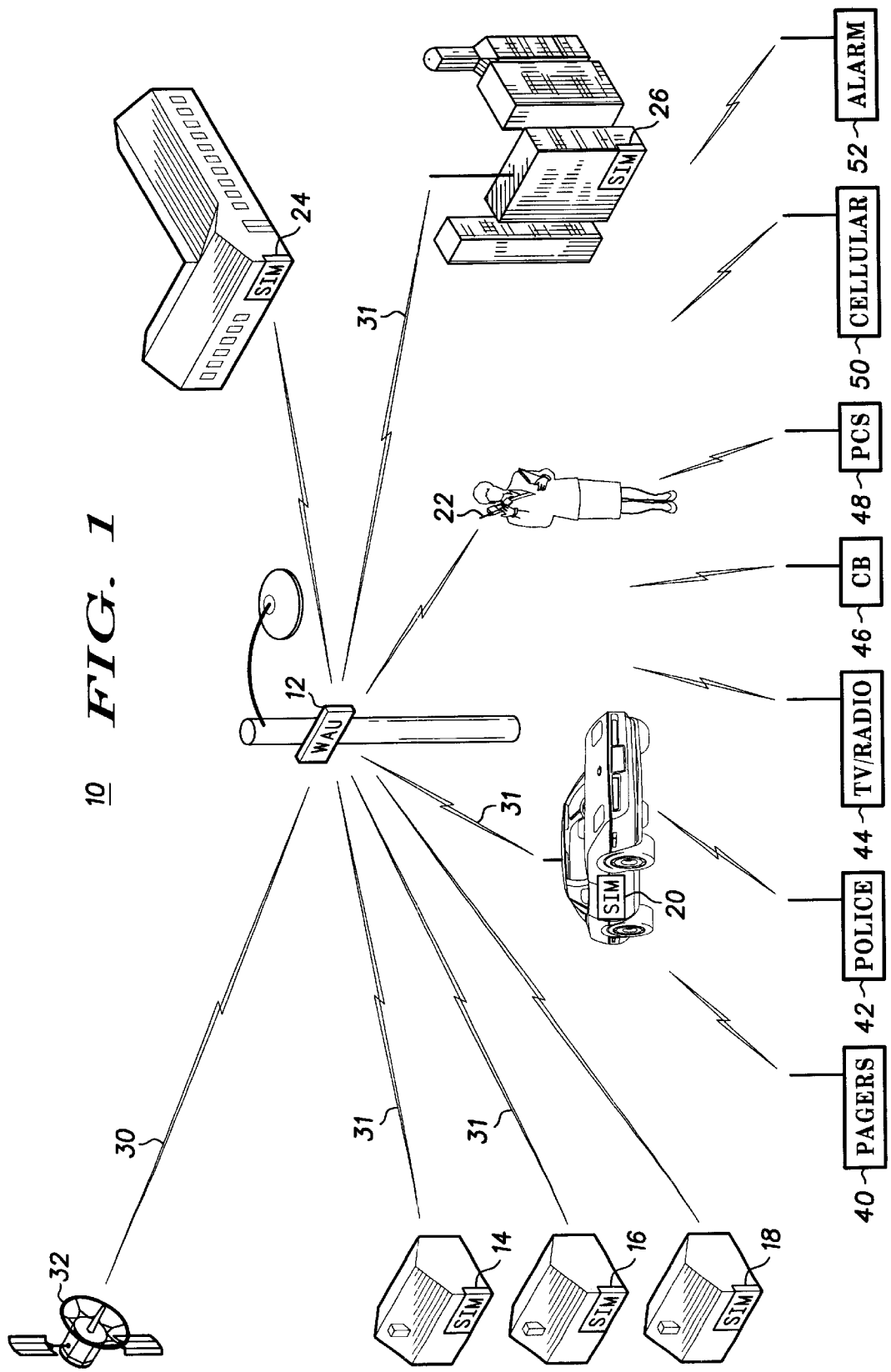
FIG. 1 is a diagram illustrating a centralized wireless information transfer system in accordance with one embodiment of the present invention.

FIG. 1 is a diagram illustrating a commercial WITS system 10 that can utilize the principles of the present invention. A more detailed description of a WITS system is given in copending U.S. patent application Ser. No. 09/066,794, which is hereby incorporated by reference. The WITS system 10 includes a wireless access unit (WAU) 12 for use in providing high data rate wireless services to a number of terrestrial user devices 14–26. In a preferred embodiment, the WAU 12 and the associated terrestrial user devices 14–26 form a "cell" within a larger WITS system that covers a much larger geographic area than the single cell of FIG. 1.

Each of the terrestrial user devices 14–26 includes wireless transceiver equipment for use in communicating with other wireless entities within a predetermined range of the device. In one embodiment of the invention, one or more of the terrestrial user devices 14–26 include a subscriber interface module (SIM) that can be inserted, for example, into a personal computer for use in providing wireless communications via leverage of existing consumer computer equipment.

As illustrated in FIG. 1, the terrestrial user devices 14–26 can be located virtually anywhere within communications range of the WAU 12. That is, the devices 14–26 can be located within, for example, residences, educational or medical buildings, office buildings, vehicles, or they can be carried by pedestrians or soldiers. It should be appreciated that both the number and the type of terrestrial user serviced by a particular WAU 12 can vary depending on the application. For example, in a military application, the terrestrial users may include a plurality of soldiers carrying Manpack or handheld communications equipment in a battlefield environment. In addition, one or more of the terrestrial user devices serviced by particular WAU can include another WAU.

As illustrated in the embodiment of FIG. 1, the WAU 12 uses a high data rate communications link 30 to communicate with a satellite communications system 32. The satellite communications system 32 can include, for example, a low earth orbit (LEO) system, such as the currently proposed Teledesic(TM) system. In addition to (or in the alternative to) the satellite communications system 32, other high data rate communications platforms (either wired or wireless) can be used in accordance with the present invention. For example, a high data rate link to an unmanned airborne vehicle (UAV) or other elevated means can be implemented. In one embodiment, the WAU 12 includes wired connections to a synchronous optical network (SONET), an asynchronous transfer mode (ATM) based network, and a cable television network. Other high data rate service sources, such as terrestrial wireless platforms, can also be used.

The WAU 12 is also capable of supporting high data rate terrestrial wireless links 31 with each of the terrestrial user devices 14–26. In this manner, the satellite communications system 32 (and/or other platform) can be used to provide high data rate communications services to each of the terrestrial user devices 14–26. High data-rate connections can also be provided among and between individual terrestrial user devices. In a typical scenario, one of the terrestrial user devices 14–26 delivers a request to the WAU 12 for a high data rate service or for a link to another user. The WAU 12 then establishes the required connection to service the request. In some cases, the WAU 12 will first need to determine whether the requesting user is authorized to use the requested connection before the request is serviced. This can be done within the WAU 12 itself or by communicating with the service source. High data rate services that can be accessed in accordance with the present invention can include, for example, digital satellite system (DSS), transmission control protocol/internet protocol (TCP/IP), high definition television (HDTV), compact disk audio, telemedicine, tele-commuting, video, remote sensing, tele-education, wireless local area network (LAN), real-time mapping, audio conferencing, videotelephone, videoconferencing, small unit operations (SUO), command and control, platoon communications, battalion communications, law enforcement communications, covert communications, file transfer protocol (FTP), remote software update, and others. As used herein, the term "high data rate" is typically used to refer to data rates equal to or exceeding, for example, 800 kilobits per second (kbps).

As illustrated in FIG. 1, the WITS system 10 operates in a locality that is also occupied by other sources of electromagnetic radiation. The other sources can include, for example, pagers 40, police band radio 42, television and radio stations 44, CB radio 46, personal communications systems (PCS) 48, cellular systems 50, and burglar alarm systems 52, as well as other non-network-member emitters, military communications, and/or others. In accordance with the present invention, the terrestrial links 31 of the WITS system 10 can operate concurrently within a portion of the electromagnetic spectrum that is also used by one or more of these other sources of radiation. That is, the invention provides a method and apparatus for allowing the WITS system 10 to coexist with these other systems without interfering with these other systems or experiencing interference from these other systems. In this manner, a given portion of the available electromagnetic spectrum is able to support a greater number of radio frequency applications than before possible. In peacetime or commercial communications, care is taken to minimize interference with existing communication systems. However, wartime military applications of the invention can include embodiments whereby interference with ambient commercial communications is allowed, hence increasing the spectrum usage options. Military applications can also include jamming and deception.

Figure 2:
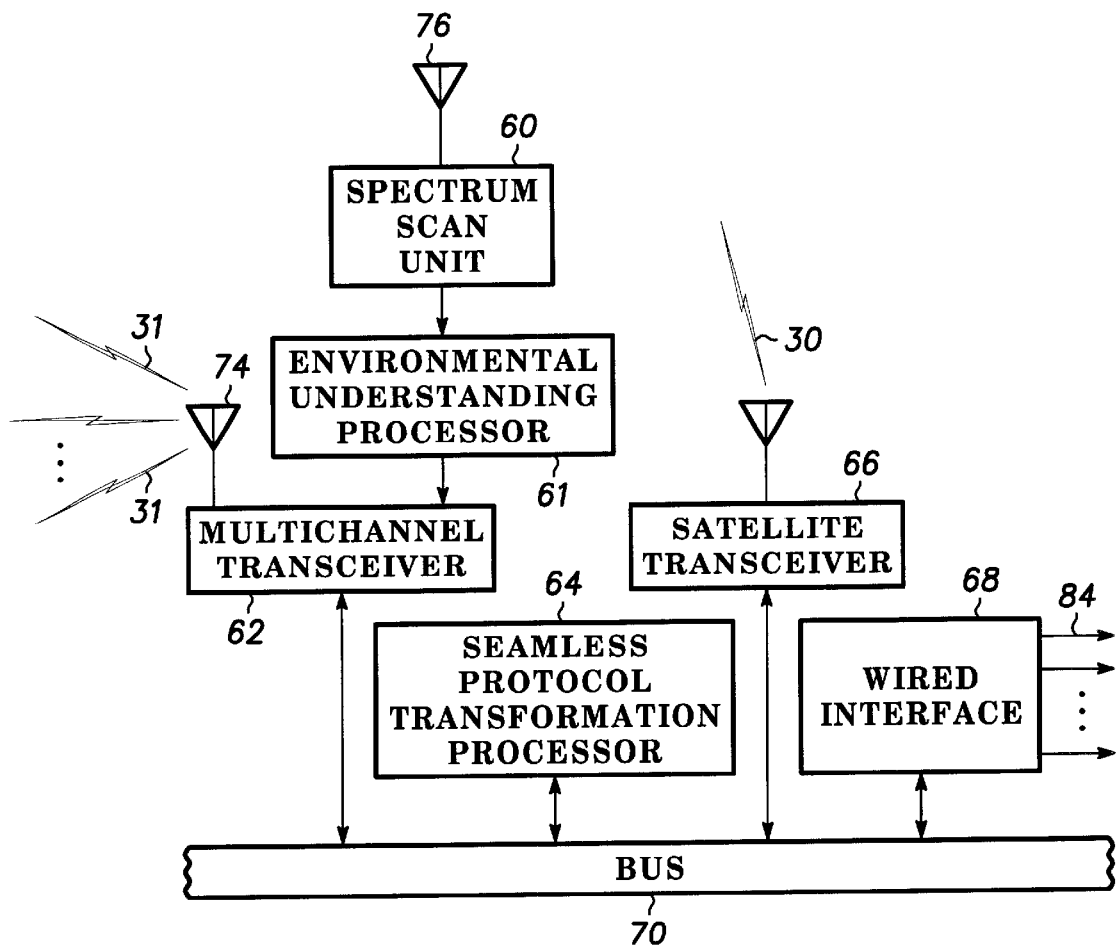
FIG. 2 is a block diagram illustrating a wireless access unit in accordance with one embodiment of the present invention.

FIG. 2 is a high-level block diagram illustrating a WAU 12 in accordance with one embodiment of the present invention. As illustrated, the WAU 12 includes: a spectrum scan unit 60, an environment understanding processor 61, a multi-channel transceiver 62, a seamless protocol transformation processor 64, a satellite transceiver 66, a wired interface 68, and a signal bus 70. It should be noted that the blocks illustrated in FIG. 2 (and in the block diagrams of the other figures) represent functional elements that do not necessarily correspond to discrete hardware units. That is, some or all of the functions represented by the blocks may be implemented within a digital processor, such as, for example, a general purpose processor (GPP), a digital signal processor (DSP), a reduced instruction set computer (RISC), a complex instruction set computer (CISC), a field programmable gate array (FPGA), a commercially available DSP such as the TI SHARC processor, and/or any other type of digital processing device residing in the WITS-WAU or SIM units. In one embodiment of the invention, all software implemented functions are executed within a single high-speed processor residing in the WITS-WAU or terrestrial communication devices or both.

The multi-channel transceiver 62 is coupled to one or more antennas 74 for servicing a number of terrestrial user devices 14–26 via a plurality of terrestrial wireless links 31. The spectrum scan unit 60 scans the spectral environment about the WAU 12 (using antenna 76) and generates a spectrum signal indicative thereof. As will be described in more detail, the multi-channel transceiver 62 uses the spectrum signal from the spectrum scan unit 60, among other things, to determine appropriate transmit parameters for use in communicating with each of the terrestrial user devices 14–26.

The satellite transceiver 66 provides a wireless link 30 to a satellite communications system 32 that is capable of providing, among other things, high data rate services. The satellite transceiver 66 can be implemented in hardware, software, or a combination of the two. In one embodiment, one or more off-the-shelf hardware transceiver "slices" are used to perform the satellite transceiver function. In another embodiment, reconfigurable processing resources, such as field programmable gate arrays (FPGAs), are used to implement elements of the satellite transceiver 66. This allows the satellite transceiver 66 to be periodically reconfigured to support, for example, changing satellite access protocols. In a preferred embodiment, the satellite transceiver 66 is capable of establishing and maintaining a plurality of individual communications channels with the satellite communications system 32 simultaneously to provide high data rate services to and among multiple terrestrial user devices at the same time.

The wired interface 68 provides a link 84 to one or more external wired systems that are capable of providing, for example, high data rate services. These external systems can include, for example, a SONET-based system, an ATM-based system, a broadband integrated services digital network (B-ISDN), a cable television network, data distribution via existing power lines, and/or others. The wired interface 68 can be implemented using hardware, software, or a combination of the two.

The seamless protocol transformation processor 64 is operative for providing the signal format conversions that are necessary for supporting communications between the terrestrial users, high data rate services, and non-native transceivers (e.g., in a transceiver bridging application). For example, in the illustrated embodiment, the seamless protocol transformation processor 64 is called upon to download a signal from the signal bus 70, convert the signal from a present signal format to a different signal format, and then transfer the converted signal back to the signal bus 70. The original signal on the bus 70 can be, for example, a high data rate receive signal from the satellite transceiver 66 that is to be delivered to a particular terrestrial user device. In this case, the converted signal that is delivered to the signal bus 70 is a signal having a format recognized by the appropriate channel of the multi-channel transceiver 62. As with the other elements, the seamless protocol transformation processor 64 can be implemented using hardware, software, or a combination of the two. Also, reconfigurable resources can be used.

The signal bus 70 acts as a signal distribution unit within the WAU 12. Using the signal bus 70, for example, the WAU 12 can establish a channel of communication between any of the terrestrial user devices 14–26 and an external high data rate communications service, via either the satellite transceiver 66 or the wired interface 68. The WAU 12 can also provide communications among the terrestrial user devices via signal bus 70, or between the terrestrial user devices and non-native transceivers to provide a bridging function. In a preferred embodiment of the invention, a new breed of high performance, low cost, compact interconnecting buses are used. These buses include, for example, the commercially available Firewire, universal serial bus (USB), and peripheral component interconnect (PCI) bus structures. In addition, the WAU 12 can include more than one bus. It should be appreciated that many different methods of performing signal distribution between elements are possible in accordance with the present invention, such as methods using multiplexers, switches, software buses, daisy chaining, or other devices/techniques. In fact, the function of the signal bus 70 can be performed by virtually any known hardware or software signal delivery method.

As described above, the spectrum scan unit 60 scans and analyzes the spectral environment about the WAU 12 to produce information regarding spectral events. Such event information can include non-network emitter information, unused or underused spectrum region information, or ambient signal information such as duty cycle, bandwidth, center frequencies, etc. Environment understanding processor 61 then collects the spectrum information corresponding to spectrum events flagged by the scan unit 60, and performs identification and expert-system functions that support the primary mode of network operation. For example, in a high rate data service application, spectrum information and environment understanding data is then transferred to the multi-channel transceiver 62 for use in determining appropriate transmit parameters for use in communicating with each of the external terrestrial user devices 14–26.

The spectrum scan unit 60 can include, for example, a spectrum analyzer device such as those that utilize filters and detectors to identify a present energy level at a number of discrete or continuous frequency points within a band of interest, flagging spectrum events. In a preferred embodiment of the invention, surveillance and environment understanding is gained via analysis of the spectrum using feature plane transformations, such as joint time-frequency representations of amplitude projections, phase projections, time projections, detection information, and signal correlation data. These transformations are analyzed to provide information specific to each discrete signal within the analysis bandwidth, such as signal type, frequency range, transmit probabilities, duty cycle, and signal strength. The feature plane transformations are preferably computed from a joint time-frequency (JTF) matrix H of order n,m, where n represents a contiguous time index and m represents a contiguous spectral index, as is indicated by the following equation:

$$H = \begin{bmatrix} h(0,0) & h(1,0) & h(2,0) & \cdots & h(m-1,0) \\ h(0,1) & & & & \\ h(0,2) & \vdots & \vdots & \vdots & \vdots \\ \vdots & & & & \\ h(0,n-1) & & \cdots & & h(m-1,n-1) \end{bmatrix} \quad \text{Eq. 1}$$

Parameter extraction algorithms can be used to compute a snapshot of spectral activity corresponding to H. For example, parameter extraction techniques such as those disclosed in U.S. patent application Ser. No. 09/114,321, which is hereby incorporated by reference, can be used. High speed signal processors or FPGAs can be used to perform the transform operations. The following structure comprises a candidate parameter set for one embodiment of the invention:

| | |
|---|---|
| fm_dev | % Instantaneous frequency bandwidth |
| fm_modes | Discrete frequency steps |
| fm_center | Center frequency |
| am_dev | % Amplitude Excursion |
| am_modes | Discrete amplitude steps |
| am_center | Mean amplitude |
| pm_dev | % Discriminator width |
| pm_modes | Discrete phase modes |
| pm_center | Mean discriminant value |
| pk_ave | Peak signal envelope to mean value |
| pk_rms | Peak signal envelope to rms value |
| bd_rate | Signal baud rate |
| dt_cycle | Duty cycle |
| cr_line | Chip rate line. |

Figure 3:
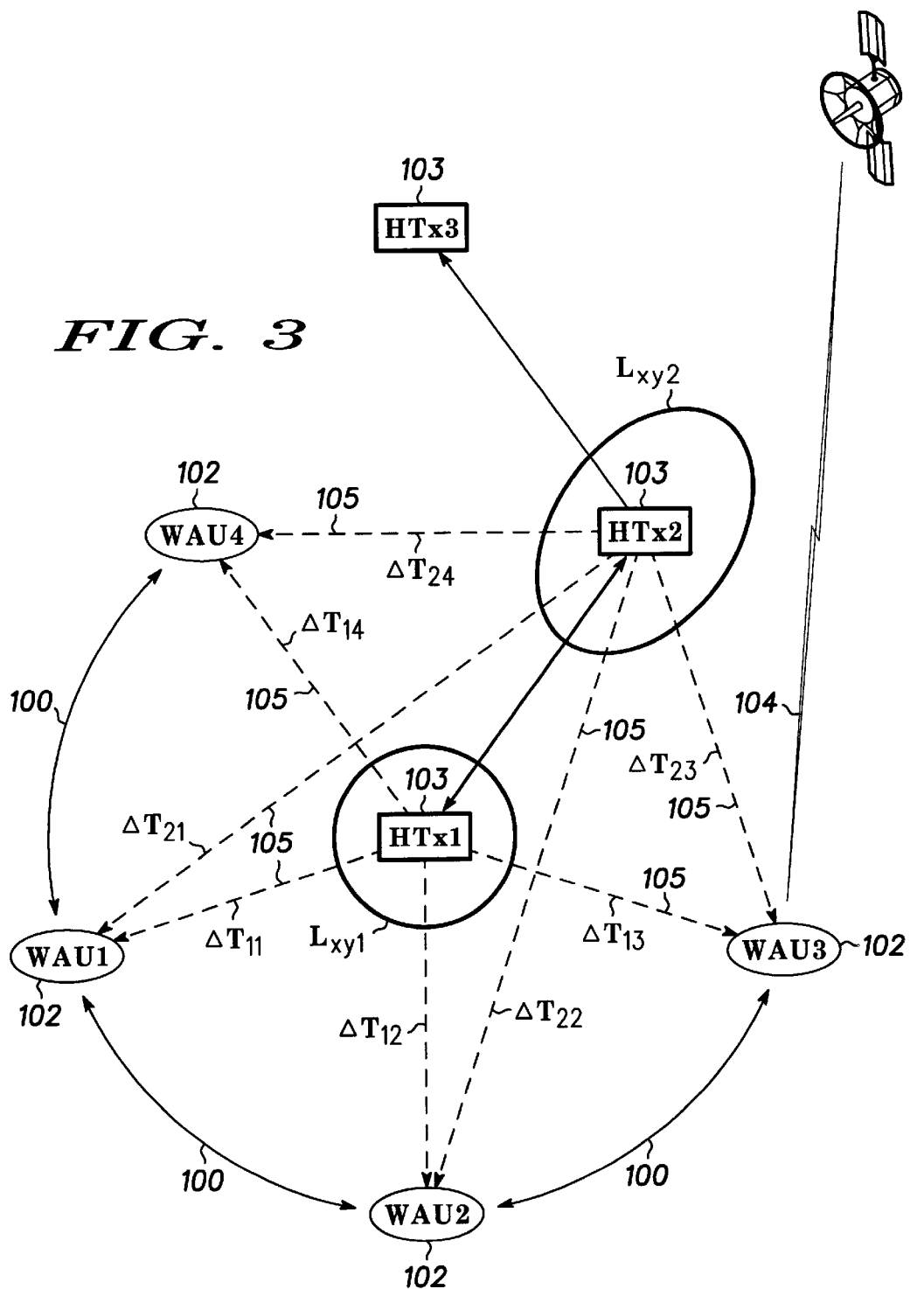
FIG. 3 is a diagram illustrating a distributed wireless information transfer system in accordance with one embodiment of the present invention.

As described above, FIG. 1 illustrates a centralized embodiment of the invention. In an alternate embodiment of the invention, as illustrated in FIG. 3, the terrestrial network includes multiple WAU units in either fixed or mobile configurations, with or without the satellite link. In this embodiment, WAU devices 102 form a distributed communications network having wireless links 100 between any WAU device 102 to any other WAU device 102, and optional satellite link 104 between one or more WAU devices 102 and one or more satellite or aircraft-based communication devices. In this embodiment of the invention, the WAU devices 102 collectively adapt to the ambient spectrum environment for communications purposes and collectively share information to enhance the "environment understanding" function. In the environment understanding function, more detailed data is gathered by the WAU devices 102 regarding non-member emitters 103, HTx1, HTx2, and HTx3, where, in this notation, the HTx refers to hostile transmitters. In the embodiment illustrated in FIG. 3, the WAU devices 102 operate collectively in an environment understanding mode to obtain geolocation estimates Lxy1 and Lxy2 of the hostile emitters HTx1 and HTx2, respectively. In this embodiment, the WAU devices 102 synchronously scan the environment via spectrum scan unit 60 at periodic intervals, with internal timing given by GPS or an internal timing clock. Using the innate processing capability of the WAU units 102, each time of arrival (TOA), represented by dotted lines 105, corresponding to communications between HTx2 and HTx1 is computed by each WAU unit 102 in the environment understanding unit 61. Using geolocation computations known to those of skill in the art, the geolocation ellipses represented by Lxy1 and Lxy2 are computed by the environment understanding processor 61, giving the general location of the hostile emitters. Environment understanding functions that can be provided by this embodiment of the invention include: emitter identification, friend or foe identification, TDOA, DOA, geolocation, signal classification, external network classification, signal alert identification (e.g., "call for fire" requests), mobile hostile emitter path prediction, speaker identification, keyword spotting, cosite contention resolution, targeting, and jamming of hostile emitters, among others. In one embodiment of the invention, the spectrum scan unit 60 scans the spectral environment about the WAU synchronously with a second spectrum scan unit 60 associated with another WAU in the system. In addition, a periodic time share mode is implemented where scan functions and radio communication functions are performed alternately to produce spectrum event data intermittently with radio functions. The spectrum scan unit 60 can also have, or have access to, a transceiver for use in transmitting said spectrum event data to other WAU units to provide network awareness of spectrum events. Data reduction can also be performed on the spectrum event data.

It may also be desirable to employ the spectrum scanning and analysis in a tagging mode. In this manner, signals within the band of interest may be identified and tagged such as military, cellular, satcom, broadcast, global positioning system (GPS), and pager. Such data of interest may also be supplemented by the TDOA estimates and network identification tags discussed above. This emitter analysis mode will provide network managers with expanded spectral awareness for each cell in the network. This information can be communicated to a network management site via the satellite link 30 or wireline links 84 shown in FIG. 2.

At sufficiently high frequencies with wide bandwidths of operation, the spectral planning mode may consist of allowing the WAU 12 in the cell to access the spectrum in a uniform distribution. In this straightforward mode, the multiple access interference (MAI) characteristics will depend primarily on the number of users accessing the selected bandwidth. Naturally, higher frequency propagation loss characteristics of this embodiment will result in smaller cells with fewer users per cell, while increased bandwidths will enhance system robustness to interference. In this mode of operation, the transmission characteristics will include both frequency hopping and pulse concealment methods in order to avoid interference with fixed communication systems.

Figure 4:
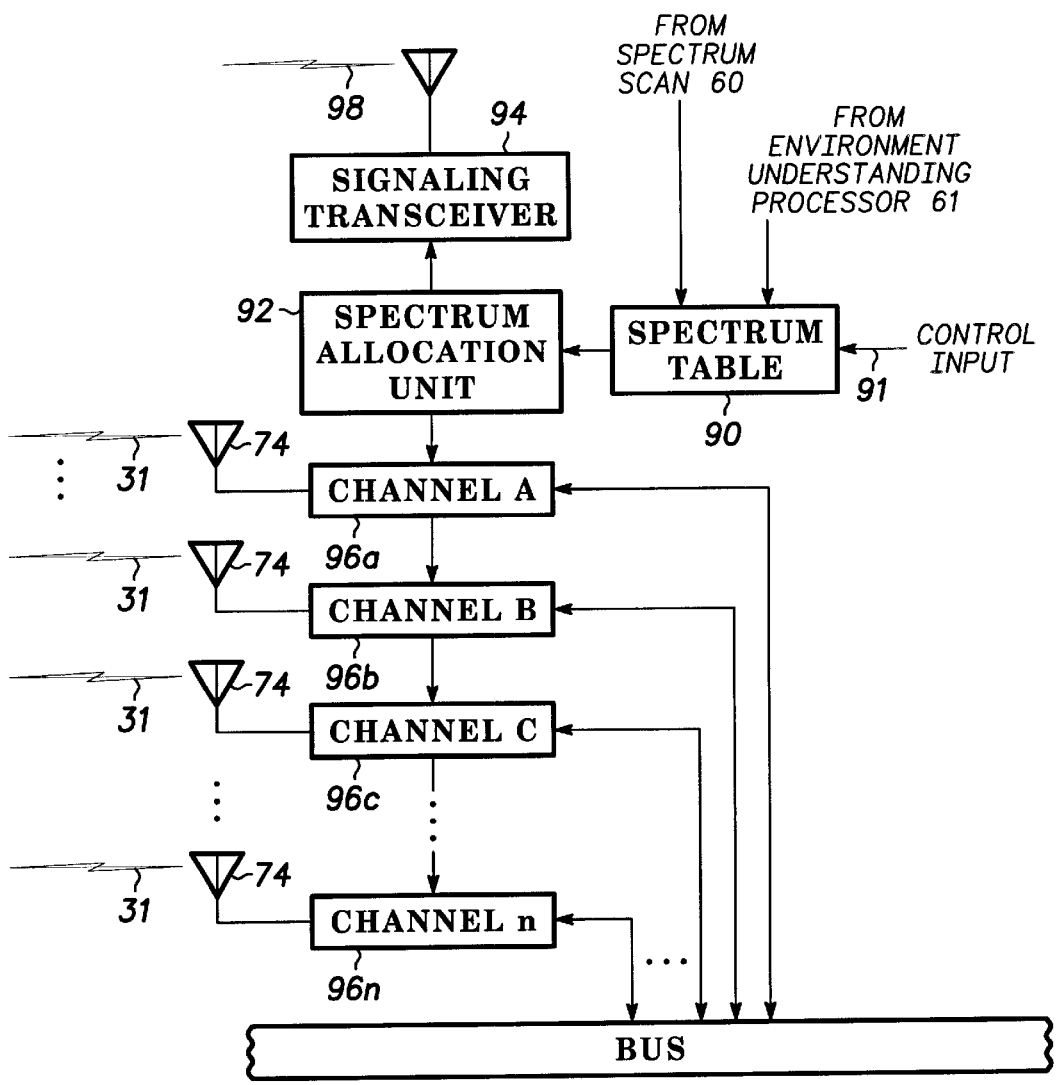
FIG. 4 is a block diagram illustrating a multi-channel transceiver in accordance with one embodiment of the present invention.

FIG. 4 is a block diagram illustrating a multi-channel transceiver 63 in accordance with one embodiment of the present invention. As illustrated, the multi-channel transceiver 63 includes: a spectrum table 90, a spectrum allocation unit 92, a signaling transceiver 94, and a plurality of radio channels 96a–96n. The plurality of radio channels 96a–96n are used to perform, among other things, transmit/receive functions to support communications with the terrestrial user devices 14–26 over the terrestrial wireless link 31. The spectrum table 90 stores information relating to the spectral environment about the WAU 12 and proximity terrestrial communications devices. The spectrum allocation unit 92 uses information from the spectrum table 90 to make spectrum allocation decisions for the WAU 12, which can include prediction estimates based on prior observed signal behaviors, as computed by the environment understanding processor 61. The signaling transceiver 94 is used to deliver information regarding a present spectrum allocation scheme to the terrestrial user devices 14–26 for use in generating appropriate transmit signals.

In a preferred embodiment, each of the radio channels 96a–96n supports communications over one of the terrestrial wireless link 31. That is, each radio channel includes all of the functionality required for: (a) generating and transmitting communications signals to a corresponding terrestrial user device via a wireless link 31 and (b) recovering information from signals received from the terrestrial user device over the same wireless link 31. In this manner, the number of terrestrial user devices that can be supported by a WAU 12 at any one time is dictated by the number of radio channels 96a–96n that are supported by the WAU 12. Multiple terrestrial user devices can be supported per channel, via, for example, time division multiple access (TDMA) methods. In one embodiment of the invention, the radio channels 96a–96n are assigned to the terrestrial user devices 14–26 based on the order within which connection requests are received. Other resource allocation procedures can also be used.

In one embodiment of the present invention, one or more of the radio channels 96a–96n utilize processing resources that are electronically reconfigurable. That is, the resources can be repeatedly reconfigured to support varying communication signal formats via an electrical control signal delivered to an input of the radio channel. In one approach, for example, a radio channel includes a digital signal processor (DSP), or other software based processor, that can be electronically reconfigured by delivering an appropriate software program to the processor. In another approach, reconfigurable hardware, such as a field programmable gate array (FPGA), is used. Combinations of reconfigurable resource types may also be implemented. As can be appreciated, the use of reconfigurable resources allows a WAU to support a constantly changing set of waveforms, protocols, and/or signal formats. This type of signal flexibility facilitates the implementation of the spectrum exploitation techniques of the present invention.

The spectrum table 90 is primarily a memory unit that stores information related to the observed spectrum environment and predicted spectrum environment about the WAU 12. In a preferred embodiment, the spectrum table 90 receives input information from the spectrum scan unit 60 and the environment understanding processor 61. In addition to its memory function, the spectrum table 90 can also include appropriate processing functionality for, for example, separating out and organizing input information. Because the spectrum environment surrounding the WAU 12 is constantly changing, the process of receiving input information and updating the spectrum table 90 is preferably continuous (although other update schemes, such as a periodic update, may also be appropriate). The spectrum table 90 can include, for example, information identifying individual interference signals presently in the frequency band of interest. This information can include, for example, signal magnitude, modulation-type, signal source identification, friend-or-foe identification, signal language identification (e.g., French, Dutch, Russian, etc.), time difference of arrival information (for indicating the location of individual signal sources with respect to the WAU 12), and/or tagging information for each of the identified signals. The type of information stored will depend on the particular application (e.g., military applications would be interested in the friend-or-foe or language information for making spectrum allocation decisions).

Historical information can also be stored in the spectrum table 90 describing the source or type of signals that normally occupy different portions of the spectrum (or that have a license to occupy certain portions of the spectrum) and the regularity with which the signals generally occur. This information can be assembled, for example, by continuously scanning the spectrum signal from the spectrum scan unit 60 and recognizing and recording patterns therein. For example, it may be determined that a nearby PCS system that is operative in a known spectral location has a large amount of communications traffic between 9 am and 8 pm on weekdays and relatively little traffic between 12 am and 6 am on weekdays. Periodically updated statistical models can be developed to keep track of the traffic patterns. As shown in FIG. 4, the spectrum table 90 can also include a control input 91 for use in storing information from a source other than the spectrum scan unit 60 or the environment understanding processor 61. For example, a priori knowledge may be available regarding spectral regions and transmit power levels of all licensed transmitters in a particular geographic area. Similarly, such a priori knowledge can include information, for example, that a nearby cellular telephone base station normally transmits a signal on a signaling channel having a particular spectral location at a particular time (or times) each day. Information derived from this knowledge can be delivered to the spectral table 90 via the control input 91. Other spectrum-related information that can be stored in the spectrum table 90 includes, but is not limited to, satellite coverage information, UAV or aircraft coverage information, environmental information (e.g., sunspot or weather data), and unknown observed signal characteristics.

The spectrum allocation unit 92 determines signal parameters for use in communicating with the terrestrial user devices 14–26 based on the spectral environment about the WAU 12. For example, in one embodiment, the spectrum allocation unit 92 determines a spectral region to be used by each of the terrestrial wireless links 31 based on knowledge of the spectral environment about the WAU 12. In another embodiment, the spectrum allocation unit 92 specifies both the signal type (e.g., data rate, modulation type, etc.) and the spectral location of signals for use within each of the terrestrial wireless link 31. Other signal parameters, such as signal amplitude, coding burden, etc., can also be specified by the spectrum allocation unit 92 in accordance with the present invention. In a preferred embodiment of the invention, the spectrum allocation unit 92 uses "network understanding" data produced by the environment understanding processor 61 to determine the optimal signal parameters. That is, the spectrum allocation unit 92 uses known or observed information about the systems surrounding the WAU 12 (e.g., information stored within the spectrum table 90) to avoid/coexist with these other systems. By using network understanding techniques, the WAU 12 can circumvent the need for extensive network planning prior to system implementation. That is, using the invention, spectrum planning is performed "automatically" after the system is up and running. In one embodiment, the environment understanding and spectrum allocation unit 92 employs heuristic methods that allow the WAU 12 to continually learn about and adapt to the environment in which it is implemented over time.

The spectrum allocation unit 92 allocates portions of the electromagnetic spectrum to the terrestrial wireless links 31 in a manner that avoids spectral regions that are likely to be active during particular time periods. That is, the spectrum allocation unit 92 identifies "spectral gaps" that it knows are less likely to be in use during particular periods of time and assigns those spectral gaps to the radio channels 96a–96n during those periods of time. The spectral gaps are determined based on, for example, the information stored in the spectrum memory 90 and, in a preferred embodiment, change over time. The overriding goal of the spectrum allocation is to operate within spectral portions that are "least likely" to cause interference. In this regard, channel activity prediction techniques can be used to predict future channel activity based on past behavior. Hence, the invention provides a method and apparatus for providing efficient utilization of available spectrum in a centralized or distributed WITS-type information transfer system, thereby reducing or eliminating the need for a large spectrum allocation or fixed frequencies of operation.

In one embodiment, the present invention provides centralized and distributed methods of environment awareness, wherein a network of communication devices performs synchronous environment scanning to provide specific information regarding ambient signals that originate outside the network. The system can further provide for cosite contention resolution and automatic spectrum planning. In this manner, the invention provides an approach that overcomes bandwidth and spectral planning problems by adaptively preserving data throughput without adding bandwidth.

In a preferred approach, the spectrum allocation unit 92 allocates one or more of the identified spectral gaps to each of the terrestrial link 31. In one embodiment, the spectrum allocation unit 92 determines the bandwidth required to support communications in each of terrestrial wireless links 31 (based on, for example, the bandwidth of a requested high data service for the link 31) and determines whether sufficient unused or underused spectral gaps exist collectively in the size required to support the bandwidth. If a single spectral gap is not available in the size required to support a particular link 31, the spectrum allocation unit 92 can assign multiple noncontiguous spectral gaps to the link 31. In such a case, the communications signals are divided into multiple spectral portions to be transmitted within the multiple spectral gaps. The terrestrial user device receiving the "split" signal then "reassembles" the signal to recover the desired information. In assigning spectrum to a particular link 31, the spectrum allocation unit 92 will generally consider the capabilities of the individual radio channel and the individual terrestrial user device associated with the link 31. That is, a link 31 will only be allocated spectral gaps within which its associated radio channel and terrestrial user device can operate. In one embodiment of the invention, the required quality of service (QOS) (e.g., BER, spectral distortion, SNR, etc.) is considered in allocating spectrum to the terrestrial wireless link 31. That is, wireless links 31 having a higher agreed to QOS will be assigned spectral gaps having a lower likelihood of experiencing interference than those having a lower QOS. Note that QOS requirements and interference tolerance with other systems will likely change depending upon peacetime or wartime rules of engagement.

After the spectrum allocation unit 92 has determined a desired allocation scheme, it delivers allocation control signals to each of the plurality of radio channels 96a–96n. The allocation control signals indicate to each radio channel the spectral gap(s) that is(are) to be used to communicate with a corresponding terrestrial user device. The allocation control signals can also indicate to each radio channel a signal type that is to be used to communicate with a corresponding terrestrial user device. The radio channels 96a–96n then adjust their internal circuitry or software in accordance with the allocation control signals. As described above, the allocation scheme may indicate that the transmit signal for a particular link is to be divided into multiple spectral portions. It may also indicate a desired modulation type or data rate for the link 31. In fact, virtually any signal parameter that can be advantageously adjusted in light of the present spectral environment can be specified by the spectrum allocation unit 92. As will be described in greater detail, in one embodiment, frequency hopping (FH) spread spectrum techniques are utilized to continuously "hop" the transmit signal for a particular link between hop set frequencies known to lie within identified spectral gaps.

As described above, the radio channels 96a–96n can each include electronically reconfigurable resources. In one embodiment of the present invention, a library of configuration data is provided for use in reconfiguring the radio channels 96a–96n. That is, a memory is provided that stores a number of configurations (e.g., FPGA files and/or software routines) that each correspond to a particular signal format or type (e.g., hybrid direct sequence pseudo noise/frequency hopping (DS/FH) signal type, baud rates, modulation type, power level, etc.). The spectrum allocation unit 92 indicates to each radio unit which configuration is to be used to implement the optimum or near optimum spectrum allocation scheme that corresponds to the observed spectrum conditions. The radio units then retrieve the designated configuration and reconfigure themselves in accordance therewith. Alternatively, the spectrum allocation unit 92 can retrieve and deliver the appropriate configuration to each radio unit. The spectrum allocation unit 92 may also have to indicate initialization information for use with each of the configurations. For example, one of the configurations may implement a three-way split of a 5-ary frequency shift keying (FSK) signal between three available spectral gaps, with, for example, three frequency rails in one spectral region, and the remaining two frequency rails in the available frequency regions, respectively, with appropriate guard regions. In assuming a particular system configuration, the spectrum allocation unit 92 will have to designate the locations of the three spectral gaps to be filled.

In a preferred embodiment, the spectrum allocation unit 92 includes interrupt functionality that allows it to interrupt or pause communications on a particular terrestrial wireless link 31 when it is determined that another system has begun or is expected to begin transmitting within a spectral region allocated to that terrestrial wireless link 31. In one possible response, the spectrum allocation unit 92 terminates transmissions over the terrestrial wireless link 31 until a new spectral region has been assigned to the link 31. In another response, the spectrum allocation unit pauses terrestrial communications until the link again becomes available. In yet another possible response, the spectrum allocation unit 92 reduces the peak power of the signal transmitted over the terrestrial wireless link 31 so that it is not an interference threat to the other system. For example, the spectrum allocation unit 92 can increase the direct sequence processing gain of the signal until it is below a known noise floor. Alternatively, the spectrum allocation unit 92 can use knowledge of the other system (obtained, e.g., from the spectrum table 90) to determine how much processing gain increase is required to confidently prevent interference with the other system. Again note that peacetime and wartime rules of engagement will likely be different. After implementing a response, the spectrum allocation unit 92 can instruct an affected radio channel 96a–96n to implement an appropriate interference suppression technique to reduce the effect of the transmission from the other system within the WAU 12. The affected terrestrial user device can also be instructed to implement interference suppression, via a dedicated signaling channel, or interference suppression can be an automatic background task performed by each of the communication devices.

In accordance with a preferred embodiment of the present invention, a signaling transceiver 94 is provided to maintain a signaling channel 94 between the WAU 12 and the terrestrial user devices 14–26 or other WAU devices. The signaling channel 98 is a wireless communications channel that is used by the WAU 12 to inform each of the terrestrial user devices 14–26 or other WAU devices of the current spectral region(s) and signal format being used to communicate with the terrestrial user devices or WAU devices. The signaling transceiver 94 receives allocation information from the spectrum allocation unit 92 and assembles the information into an appropriate format for delivery to the terrestrial user devices 14–26 or WAU devices via the signaling channel 98. Upon receiving the information, the terrestrial user devices 14–26 or WAU devices adjust their transmit/receive circuitry and/or software in accordance therewith. As can be appreciated, it is important that the signaling channel 98 be highly reliable and, therefore, the signaling channel 98 is preferably placed in a fixed portion of the spectrum that is not assigned to or used by any other systems (i.e., a very low likelihood of interference). Alternatively, the channel may be implemented in an overlaid fashion using direct sequence modulation techniques, resulting in the channel operating below the observed noise floor. Because the information content carried on the signaling channel 98 is relatively low, only a small portion of the available spectrum need be assigned, or relatively low data rate be implemented in most cases. In one embodiment of the invention, a code division multiple access (CDMA) scheme is used within the signaling channel 98. However, as will be apparent to a person of ordinary skill in the art, any of a number of access schemes can be employed.

The spectrum allocation process of the present invention preferably operates in real-time (or near real-time). This allows the WAU 12 to continuously (or periodically) adapt to the current spectral environment to prevent undesired interference from/to surrounding systems. For example, in a near real-time system, the WAU 12 is able to change the transmit/receive characteristics being used by a particular radio channel immediately upon detecting the presence of energy from another source within the spectral portions being used by the radio channel. In one embodiment of the invention, the spectrum allocation unit 92 is capable of making intelligent decisions to avoid interference with systems in the vicinity of the WAU 12. For example, in one approach, the spectrum allocation unit 92, after detecting the presence of energy from another system in a gap being used by a particular terrestrial wireless link 31 (by, for example, consulting the spectrum table 90, or analyzing link quality), immediately terminates communications over the link 31 and consults the spectrum table 90 for an alternative spectral gap (or gaps). Once found, the spectrum allocation unit 92 reconfigures the affected channel and delivers the appropriate information to the signaling transceiver 94 for delivery to the corresponding terrestrial user device. After a predetermined time period (or after an acknowledgment signal has been received from the terrestrial user device via the signaling channel), the affected radio channel is allowed to resume communication. Note that in addition to channel reassignment, the system may force the terrestrial communication unit to pause transmission until the channel reopens. In most cases, the "collision" between systems will be of such short duration that it has negligible effect on operation of either system. For embodiments of the invention using direct sequence spreading techniques, the power level of the WITS transmissions will normally be low enough that they are not even detected by the other system. Very fast processors and signal processing devices are now available (e.g., SHARC chips, FPGAs, etc.) that are capable of performing both spectrum awareness and radio functions simultaneously in near real time.

In addition to the above techniques, interference countermeasures (such as targeted interference suppression as described in copending U.S. patent application Ser. No. 09/016,030, which is hereby incorporated by reference) can be implemented within the WAU 12 and the terrestrial user devices 14–26 to reduce the effect of interference from other systems within the WITS system 10. Node affiliation/de-affiliation techniques can also be provided for supporting mobile nodes.

Figure 5:
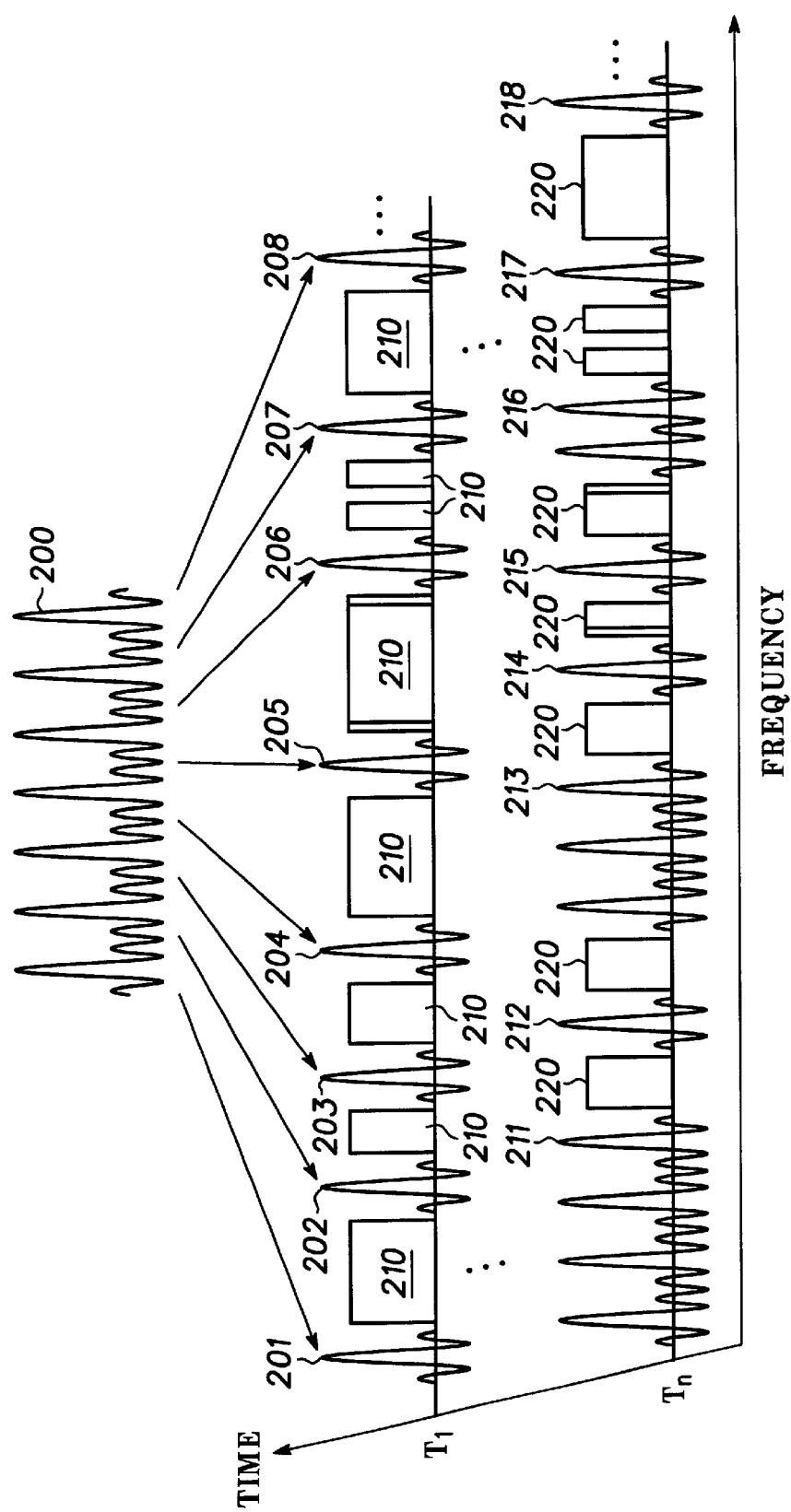
FIG. 5 is a joint time-frequency (JTF) representation illustrating the dynamics of a spectrum allocation scheme in accordance with the present invention.

FIG. 5 is a joint frequency time (JFT) representation of the dynamics of the spectrum allocation process in one embodiment of the present invention. As illustrated, at time T1, a communications signal 200 is split up into a plurality of different spectral portions 201–208 to fit within spectral gaps between spectral components 210 identified within the environment of the WAU 12. At a later time, T2, the communications signal 200 is divided into a different plurality of spectral portions 211–218 to fit within spectral gaps between different spectral components 220. As described above, this spectral allocation process is continually or contiguously adapting over time.

Figure 6:
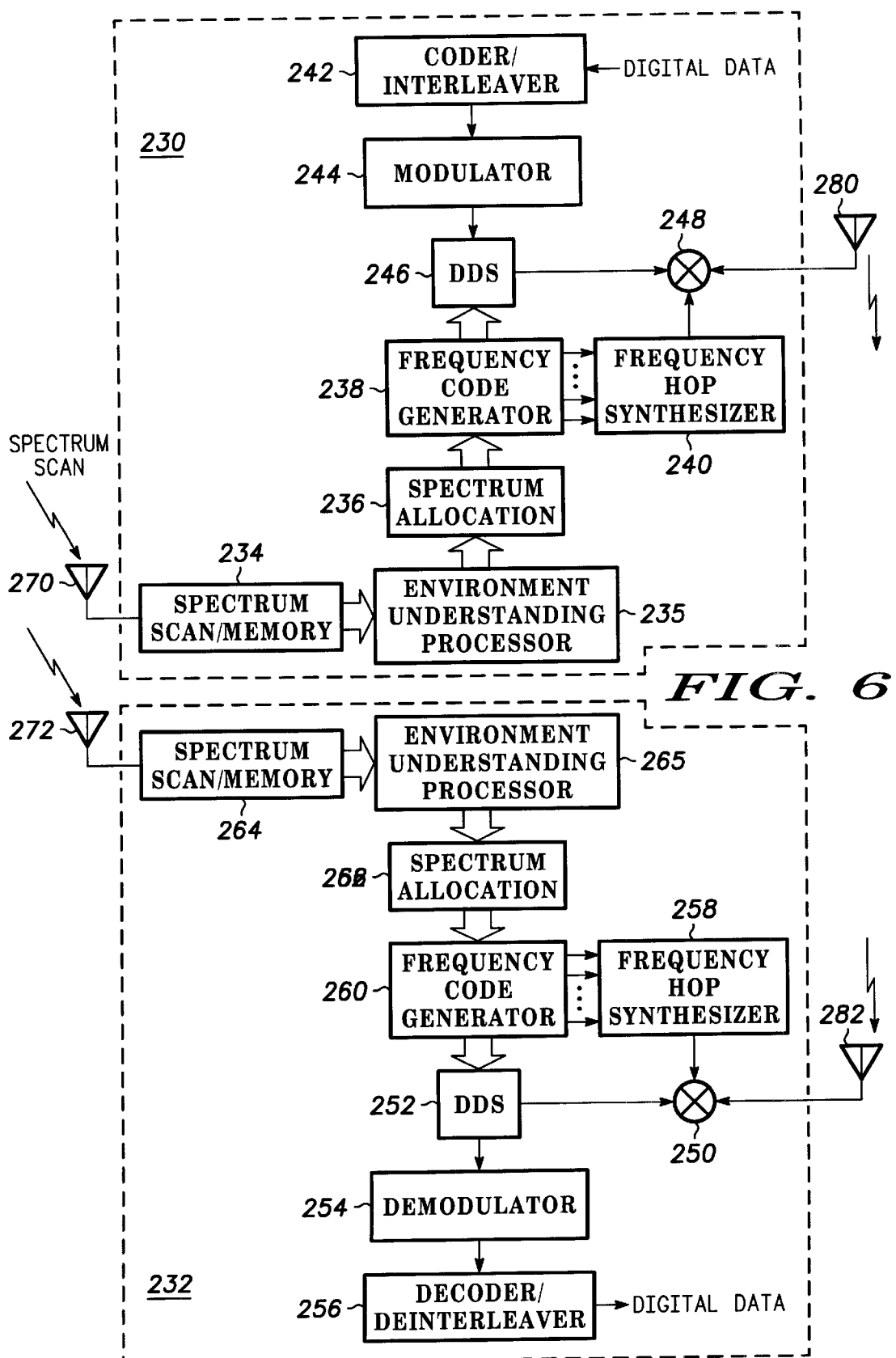
FIG. 6 is a block diagram illustrating a WAU radio channel and an associated terrestrial user device in accordance with the present invention.

FIG. 6 is a functional block diagram illustrating one radio channel 230 of a WAU and a corresponding terrestrial user device 232 in accordance with one embodiment of the present invention. It should be appreciated that, although not illustrated, each of these devices are preferably capable of full duplex operation. The radio channel 230 and terrestrial user device 232 each utilize frequency hopping techniques to avoid portions of the useable spectrum that are likely to include potentially interfering signals. The radio channel 230 includes: a spectrum scan unit/memory 234, an environment understanding processor 235, a spectrum allocation unit 236, a frequency code generator 238, a frequency hop synthesizer 240, a channel coder/interleaver 242, a modulator 244, a direct digital synthesis (DDS) unit 246, and a mixer 248. The terrestrial user device 232 includes: a mixer 250, a DDS 252, a demodulator 254, a decoder/deinterleaver 256, a frequency hop synthesizer 258, a frequency code generator 260, a spectrum allocation unit 262, a spectrum scan unit/memory 264, and an environment understanding processor 265, and performs essentially the reverse operation of the radio channel 230.

The spectrum scan unit/memory 234 is coupled to an antenna 270 for use in scanning the spectral environment about the WAU. In this regard, the antenna 270 must be of the appropriate bandwidth to cover the entire spectral region within which the WAU is operative. The spectrum scan unit/memory 234 and environment understanding processor 235 perform essentially the same functions as the spectrum scan unit 60, environment understanding processor 61, and spectrum table 90 described previously. The spectrum allocation unit 236 determines a frequency sequence to be followed by the radio channel 230 in communicating with the terrestrial user device 232 based on the observed, expected, or predicted spectral environment. To determine the frequency sequence, the spectrum allocation unit 236 retrieves the data stored in the spectrum scan unit/memory 234 and determines frequencies corresponding to spectral gaps indicated therein. The frequency sequence is then assembled as a series of these frequencies. In assembling the frequency sequence, the spectrum allocation unit 236 needs to make sure that it does not assign the same frequency to two different radio channels at the same time. The frequency code generator 238 receives the frequency sequence information from the spectrum allocation unit 236 and uses it to generate control signals for the DDS 246 and the frequency hop synthesizer 240.

The channel coder/interleaver 242 receives high data rate digital data at an input and performs channel coding and/or interleaving on the digital data in accordance with a predetermined signal format. The modulator 244 then modulates the signal in accordance with the predetermined signal format. The DDS 246 and the mixer 248 then shift the frequency of the modulated data signal in accordance with the control signals from the frequency code generator 238. The output of the mixer 248 (i.e., the transmit signal) is then transmitted from the radio channel 230 via antenna 280. The signal transmitted from the antenna 280 emits operating frequencies with hopsets that alternate between the identified spectral gaps.

The terrestrial user device 232 receives the transmitted signal in antenna 282 and delivers the signal to the mixer 250. The remainder of the terrestrial user device 232 then processes the received signal in essentially a reverse procedure to that of the radio channel 230. It should be pointed out that the embodiment of the invention illustrated in FIG. 6 does not utilize a signaling channel to inform the terrestrial user device 232 of the signal format of the transmitted signal. Instead, the terrestrial user device 232 includes a spectrum scan unit/memory 264 and spectrum allocation unit 262 that implements the same algorithms as the corresponding units in radio channel 230. That is, it is assumed that the radio channel 230 and the terrestrial user device 232 will be sufficiently close in practice so that the spectral environment about each unit is practically the same. Therefore, identical processing of the spectral information will generate the same frequency sequence in both units. Using this technique eliminates the need for a signaling channel between the WAU and the terrestrial user devices and the associated allocation of dedicated spectrum.

The system of FIG. 6 can be modified to also include direct sequence spread spectrum equipment for use in avoiding interference. That is, a direct sequence spreader can be inserted, for example, between the modulator 244 and the DDS 246 for use in spreading the data signal over a predetermined bandwidth. The spread data signal output by the direct sequence spreader is then frequency hopped between spectral gaps to create the transmit signal. Because the processing gain of the transmit signal allows it to operate at power levels at or below the ambient noise floor, it is much less likely to cause interference with other systems, even if they are currently active. Therefore, the number of spectral regions that the WITS system can safely operate within are increased. A direct sequence despreader will also have to be inserted between the DDS 252 and the demodulator 254 of the user device 232. As described above, interference suppression techniques can be implemented within the system to reduce the effects of in-band interference.

Although the present invention has been described in conjunction with its preferred embodiment(s), it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A wireless access unit (WAU) for use in providing high data rate information services to a plurality of terrestrial user devices distributed within a coverage region, said WAU comprising:
    a spectrum scan unit for scanning a spectral environment about said WAU;
    a multi-channel transceiver, coupled to said spectrum scan unit, for use in communicating with the plurality of terrestrial user devices via a plurality of terrestrial wireless links, said multi-channel transceiver determining transmit signal parameters for said plurality of terrestrial wireless links based on information related to said spectral environment; and
    a satellite transceiver for use in communicating with a satellite communications system via a wireless satellite communications link, said satellite transceiver being coupled to said multi-channel transceiver for use in establishing a connection between one of the plurality of terrestrial user devices and the satellite communications system.

2. The WAU, as claimed in claim 1, wherein:
    said multi-channel transceiver includes a spectrum allocation unit for allocating a portion of the electromagnetic spectrum to each of said plurality of terrestrial wireless links based on said information related to said spectral environment.

3. The WAU, as claimed in claim 2, wherein:
    said information related to said spectral environment includes historical data related to said spectral environment.

4. The WAU, as claimed in claim 3, wherein:
    said historical data related to said spectral environment includes communications traffic pattern data.

5. The WAU, as claimed in claim 3, wherein:
    said multi-channel transceiver includes means for identifying spectral gaps in said spectral environment about said WAU using said historical data, said spectral gaps comprising portions of the electromagnetic spectrum that are less likely to be used by other systems surrounding said WAU than other portions of the electromagnetic spectrum.

6. The WAU, as claimed in claim 5, wherein:
    said spectral gaps identified by said means for identifying change with time.

7. The WAU, as claimed in claim 5, wherein:
    said spectrum allocation unit allocates said spectral gaps to said plurality of terrestrial wireless links.

8. The WAU, as claimed in claim 1, further comprising:
    a spectrum table, coupled to said spectrum scan unit, for use in assembling data related to said spectral environment.

9. The WAU, as claimed in claim 1, further comprising:
    an environment understanding processor, coupled to said spectrum scan unit, for identifying non-network emitters in a vicinity about said WAU based on an output signal of said spectrum scan unit.

10. The WAU, as claimed in claim 9, wherein:
    said environment understanding processor provides an estimated location of each of said non-network emitters.

11. The WAU, as claimed in claim 1, further comprising:
    a wired interface for use in communicating with at least one external wired communications system via a wired communications link.

12. The WAU, as claimed in claim 1, further comprising:
    a protocol transformation processor for use in converting communications signals between different signal formats, said protocol transformation processor being coupled to said multi-channel transceiver and said satellite transceiver for providing an interface therebetween.

13. The WAU, as claimed in claim 1, wherein:
    said multi-channel transceiver is capable of communicating with a terrestrial user device at a data rate equal to or exceeding 800 kilobits per second.

14. A communications system comprising:
    a plurality of terrestrial user devices distributed within a service region, each of said plurality of terrestrial user devices including a wireless transceiver for use in communicating with other wireless entities within said geographic region;
    a communications platform, located outside said service region, that is capable of providing high data rate information services; and
    a wireless access unit (WAU) for use in providing a communications connection between said plurality of terrestrial user devices and said communications platform, said WAU including:
        a spectrum scan unit for scanning a spectral environment about said WAU;
        a multi-channel transceiver, coupled to said spectrum scan unit, for use in communicating with said plurality of terrestrial user devices via a plurality of terrestrial wireless links, said multi-channel transceiver determining transmit signal parameters for said plurality of terrestrial wireless links based on information related to said spectral environment; and
        an interface device, coupled to said multi-channel transceiver, for use in communicating with said communications platform.

15. The communications system, as claimed in claim 14, wherein:
    said plurality of terrestrial user devices includes at least one other WAU.

16. The communications system, as claimed in claim 14, wherein:

said plurality of terrestrial user devices includes a personal computer having a subscriber interface module (SIM).

17. The communications system, as claimed in claim 14, wherein:
said communications platform includes a satellite in a satellite communications system; and
said interface device includes a satellite transceiver.

18. The communications system, as claimed in claim 14, wherein:
said communications platform includes a wired communications system; and
said interface device includes a wired interface device for communicating with said wired communications system via a wired connection.

19. The communications system, as claimed in claim 18, wherein:
said wired connection includes commercial power lines as a transmission medium.

20. The communications system, as claimed in claim 14, wherein:
said WAU includes means, coupled to said spectrum scan unit, for identifying portions of the electromagnetic spectrum in spectral environment about said WAU that are less likely to be used by other systems surrounding said WAU than other portions of the electromagnetic spectrum.

21. The communications system, as claimed in claim 20, wherein:
said WAU includes a spectrum allocation unit for allocating said spectral gaps to said plurality of terrestrial wireless links.

22. A wireless access unit (WAU) for use in providing high data rate information services to a plurality of terrestrial user devices via a plurality of terrestrial wireless links, said plurality of terrestrial user devices being distributed within a coverage region, said WAU comprising:
a spectrum scan unit for scanning a spectral environment about said WAU;
a spectrum allocation unit for allocating spectrum to each of the plurality of terrestrial wireless links based upon information related to said spectral environment, said spectrum allocation unit generating an allocation control signal; and
a radio channel, coupled to said spectrum allocation unit, for use in generating a transmit signal for delivery to a first terrestrial user device in the plurality of terrestrial user devices, said radio channel being responsive to said allocation control signal for setting a frequency of said transmit signal.

23. The WAU, as claimed in claim 22, wherein:
said radio channel includes a frequency hopping apparatus for use in varying a center frequency of said transmit signal in accordance with a frequency hopping sequence indicated by said allocation control signal.

24. The WAU, as claimed in claim 23, wherein:
said frequency hopping apparatus includes a frequency code generator that is coupled to said spectrum allocation unit for generating at least one frequency hopping control signal in response to said allocation control signal.

25. The WAU, as claimed in claim 23, wherein:
said frequency hopping apparatus includes a direct digital synthesis (DDS) unit for use in generating said transmit signal, said DDS unit being responsive to said at least one frequency hopping control signal.

26. The WAU, as claimed in claim 23, wherein:
said frequency hopping apparatus includes a mixer for use in generating said transmit signal, said mixer being responsive to said at least one frequency hopping control signal.

27. The WAU, as claimed in claim 22, further comprising:
a signaling transceiver, coupled to said spectrum allocation unit, for use in delivering spectrum allocation information to said plurality of terrestrial user devices via a wireless signaling channel.

28. The WAU, as claimed in claim 22, wherein:
said radio channel includes a direct sequence spread spectrum apparatus for setting a processing gain of said transmit signal in accordance with said allocation control signal.

29. The WAU, as claimed in claim 22, wherein:
said spectrum allocation unit adapts to a changing spectral environment.

30. A communications system comprising:
a plurality of wireless access units (WAU) distributed within a terrestrial coverage region, each of said plurality of WAUs for use in providing high data rate information services to other WAUs in said plurality of WAUs, at least one of said plurality of WAUs comprising:
a spectrum scan unit for scanning a spectral environment about said at least one WAU;
an environment understanding processor, coupled to said spectrum scan unit, for assembling and providing signal information related to signal emitters in proximity to said at least one WAU; and
a multi-channel transceiver, coupled to said environment understanding processor, for use in communicating with other WAUs via a plurality of terrestrial wireless links, said multi-channel transceiver determining transmit signal parameters for said plurality of terrestrial wireless links using said signal information.

31. The communications system, as claimed in claim 30, wherein:
said spectrum scan unit scans said spectral environment synchronous with a second spectrum scan unit associated with another WAU in said plurality of WAUs to produce spectrum event data.

32. The communications system, as claimed in claim 31, wherein:
said spectrum scan unit scans said spectral environment synchronous with a second spectrum scan unit associated with another WAU in said plurality of WAUs in a periodic time share mode with radio communication functions to produce spectrum event data intermittently with radio functions.

33. The communications system, as claimed in claim 31, wherein:
said at least one WAU includes means for transmitting said spectrum event data to other WAU units to provide network awareness of spectrum events.

34. The communications system, as claimed in claim 31, wherein:
said environment understanding processor performs data reduction of said spectrum event data to produce reduced spectrum event data.

35. The communications system, as claimed in claim 30, wherein:
said at least one WAU includes a spectrum allocation unit for allocating portions of the useable spectrum to each of said plurality of terrestrial wireless links based on said signal information.

36. The communications system, as claimed in claim 30, wherein:

said at least one WAU includes means for performing automatic spectrum planning and cosite contention resolution.

37. The communications system, as claimed in claim 30, further comprising:

a satellite transceiver for use in communicating with a satellite communications system via a wireless satellite communications link, said satellite transceiver being coupled to said multi-channel transceiver for use in establishing a connection between a selected one of the plurality of terrestrial user devices and the satellite communications system.

38. The communications system, as claimed in claim 30, further comprising:

an aircraft transceiver for use in communicating with an aircraft via a wireless aircraft communications link, said aircraft transceiver being coupled to said multi-channel transceiver for use in establishing a connection between a selected one of the plurality of terrestrial user devices and the aircraft.

39. The communications system, as claimed in claim 38, wherein the aircraft is an unmanned airborne vehicle (UAV).

40. The communications system, as claimed in claim 38, wherein the aircraft is a lighter-than-air vehicle.

41. The communications system, as claimed in claim 30, wherein:

said signal information includes time-difference-of-arrival information (TDOA) for an external emitter.

42. The communications system, as claimed in claim 30, wherein:

said signal information includes direction-of-arrival (DOA) information for an external emitter.

43. The communications system, as claimed in claim 30, wherein:

said signal information includes geolocation information for an external emitter.

44. The communications system, as claimed in claim 43, wherein said geolocation information includes information defining regions corresponding to probable locations of signal emitters.

45. The communications system, as claimed in claim 30, wherein:

said signal information includes targeting information corresponding to an external emitter.

46. The communications system, as claimed in claim 30, wherein:

said signal information includes hostile alert information corresponding to an external emitter.

47. The communications system, as claimed in claim 30, wherein:

said signal information includes signal modulation type used by an external emitter.

48. The communications system, as claimed in claim 30, wherein:

said signal information includes at least one of the following: language identification, dialect identification, keyword identification, radio identification, network identification, and speaker identification corresponding to an external emitter.

49. The communications system, as claimed in claim 30, wherein:

said signal information includes at least one of the following: friend-or-foe identification for an emitter, signal emitter velocity, signal emitter direction of movement, and signal emitter predicted path.

50. The communications system, as claimed in claim 30, wherein:

said signal emitters in proximity to said at least one WAU are not part of said communications system.

51. The communications system, as claimed in claim 30, wherein:

said at least one WAU comprises system configuration memory for storing a plurality of system configurations for use in configuring individual channels of said multichannel transceiver.

52. The communications system, as claimed in claim 51, wherein:

said plurality of system configurations include operating parameter designations for at least one of the following: modulation type, signal power level, signal hop set, signal processing gain, signal center frequency, and signal data rate.

* * * * *

UNITED STATES PATENT AND TRADEMARK OFFICE
CERTIFICATE OF CORRECTION

PATENT NO. : 6,385,434 B1  Page 1 of 1
APPLICATION NO. : 09/153976
DATED : May 7, 2002
INVENTOR(S) : Jeffery Scott Chuprun et al.

It is certified that error appears in the above-identified patent and that said Letters Patent is hereby corrected as shown below:

Column 1,
Lines 3 and 4, insert the following:
-- This invention was made with government support under Contract No. DAAL01-96-2-0002. The government may have certain rights in this invention. --.

Signed and Sealed this

Twentieth Day of June, 2006

JON W. DUDAS
*Director of the United States Patent and Trademark Office*